350-389 SR
OR 3,503,668
X4047N
WP
SEARCH R
March 31, 1970 M. DI DOMENICO, JR., ET AL 3,503,668
ELECTRIC FIELD DEPENDENT DICHROIC DEVICES
Filed April 19, 1966
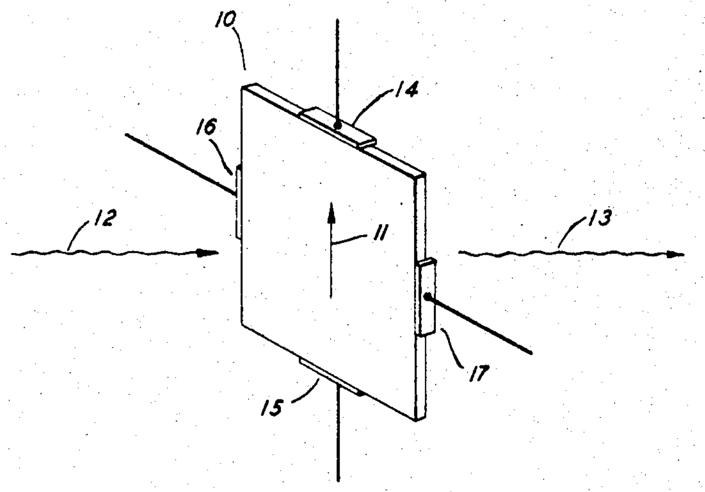
INVENTORS: M. DI DOMENICO, JR.
J. P. REMEIKA
E. G. SPENCER
BY George S. Indig
ATTORNEY

United States Patent Office 3,503,668

Patented Mar. 31, 1970

3,503,668

ELECTRIC FIELD DEPENDENT DICHROIC DEVICES

Mauro Di Domenico, Jr., Madison, Joseph P. Remeika, Warren Township, Somerset County, and Edward G. Spencer, Union, N.J., assignors to Bell Telephone Laboratories, Incorporated, New York, N.Y., a corporation of New York Filed Apr. 19, 1966, Ser. No. 543,580

Int. Cl. G02f *1/26, 1/28;* G02b *5/30*

U.S. Cl. 350—150 9 Claims

ABSTRACT OF THE DISCLOSURE

A light beam is modulated within a medium depending upon the direction and magnitude of an applied electric field. The effect of the field is to introduce or alter dichroism within the medium.

This invention relates to light frequency devices depending for their operation on a material evidencing an electric field dependent dichroism. In a preferred embodiment these devices utilize a critically doped barium titanate crystal evidencing the desired characteristics.

In copending application Ser. No. 543,603, filed Apr. 19, 1966 (J. P. Remeika), it is observed that barium titanate crystals containg from 0.05 to 5.0 weight percent bismuth evidence an electrically switchable dichroism. Such crystalline material, which may be in plate form such as produced from butterfly twin crystals, has been described in the copending application Ser. No. 543,603 noted above.

The existence of dichroism in a ferroelectric material suggests a relationship between this property and an applied electric field and, in fact, such is observed. At temperatures below the Curie point the dichroism, which in a-domain barium titanate plates favors light transmission for light polarized perpendicular to the ferroelectric axis over most of the transmission bandwidth, may be rotated along with the ferroelectric axis. Slightly above the ferroelectric Curie point in the absence of an applied field, materials manifesting hte described characteristics are not dichroic. Application of an electric field of appropriate magnitude, however, may re-induce the dichroism.

In accordance with this invention, there is described a class of devices depending for their operation upon the rotation or induction of dichroism by an applied electric field. Devices of the invention are digital by nature, since the dichroism, considering either the more or less absorbing directions of polarization, can be made to occur only along a major crystallographic axis. As has been indicated, certain of these devices are designed to operate below the Curie point; certain above.

Basically, these devices are light shutters which can be made to pass or absorb a plane polarized light beam. In this use they may serve as modulators as, for example, by absorbing selected pulses of an incident pulse train, or they may serve as the pulse train generator itself.

For expediency the invention is described largely in terms of the use of bismuth doped a-domain barium titanate. This material has a useful dichroism extending from about 1.5 to about 3.8 electron volts, or in terms of wavelength, from about 8,300 Angstrom units to about 4,500 Angstrom units. In this material the dichroism is brought about by a selective absorption for light polarized parallel to and perpendicular to the ferroelectric axis, the absorptions for the parallel and perpendicular directions of polarization being about 200 and 100 reciprocal centimeters at an energy of 2 electron volts and at room temperature.

Description of the invention is expedited by reference to the drawing in which the figure is a schematic representation of a device constructed in accordance with the invention. This representation may be considered as, for example, a modulator or a generator and it is generally described:

In the figure, element 10 is a crystal of a field-dependent dichroic material, as discussed. This crystal is represented as basically tetragonal with a crystallographic axis 11 representing the ferroelectric axis or direction of spontaneous polarization when element 10 is below its ferroelectric Curie temperature. A light beam 12 is introduced as shown. The emerging beam is represented as 13. At least one pair of electrodes, such as 14–15 and 16–17, each defining a crystallographic direction, is provided. Several cases are considered.

(a) With the crystal below its ferroelectric Curie point and with a spontaneous polarization in the 11 direction, considered to define the hard transmission direction, and with beam 12 plane-polarized with its plane of polarization coinciding with the direction 11, emerging beam 13 is of minimum intensity. For an element 10 of a thickness of from one-tenth millimeter to one-quarter millimeter, the emerging beam 13 at an energy of about 2 electron volts and at room temperature has an intensity in the order of 1 percent to 10 percent that of incident beam 12. By impressing an electric field across electrodes 16 and 17, the magnitude of the field being sufficient to switch the dichroism so that the hard polarization now corresponds with a crystallographic axis orthogonal to 11 and still with light beam 12 polarized as described, a maximum intensity beam 13 results. For the example given, the intensity is of the order of 10 percent to 35 percent of the incident beam 12. The intensity of the emerging beam 13 may again be caused to attain the minimum value by applying the same magnitude electric field across electrodes 14 and 15. In a-domain barium titanate, this switching may be accomplished with an applied field in the order of $10^3$ to $10^5$ volts per centimeter. Switching may be accomplished in any fashion as by application of selective pulses across either pair of electrodes so as, for example, to produce an intelligence modulated series of optical pulses (with beam 12 either representing a steady stream of photons or, alternatively, an unmodulated pulse train).

(b) With element 10 arranged as described under (a) above and with an unpolarized beam 12, application of the same fields results in a modulation, this time expressed in terms of polarization sense, the emerging beam 13 being polarized along the plane defined by transmission direction, i.e., perpendicular to electrodes 14–15 in the first instance and perependicular to 16–17 in the second. The sense of polarization may be detected by an analyzer (not shown) which may constitute a common polarizing element, or a second field dependent dichroic element such as element 10.

(c) The device depicted still arranged in the fashion described may serve as a pulse train generator by use of a plane polarized input beam 12 and a rotating electric field which reaches a peak, first, for example, in 14–15, then 17–16, then 15–14, etc. This may be accomplished by applying a sine signal across two electrodes, as 14–15, and a cosine signal across 16–17 by means not shown. Such means may constitute a standard sine signal generator with the signal being introduced directly across one pair of electrodes and through a capacitance across the second pair. The optical pulse frequency is twice the modulating sine signal.

(d) Again, the arrangement described under (c) above may result in an emerging polarized beam 13, the polarization plane of which rotates orthogonally for a rotating applied field across element 10 where the incoming beam 12 is unpolarized. This output may be translated into a pulse train by use of an analyzer (not shown).

(e) With element 10 at a temperature immediately above the ferroelectric Curie point for the material of which it is constituted, the light transmission characteristics of the crystal are isotropic and no dichroism is in evidence. In this situation, direction 11 merely defines a major crystallographic direction. Assuming a plane polarized input beam 12 having its plane of polarization defined by its direction 11, there first results an output beam 13 of maximum intensity with no field applied, and an output beam 13 of minimum intensity upon application of a field across electrodes 14–15.

(f) The arrangement described in (d) above may be utilized with element 10 above the Curie point with the same result. Since the mechanism is one of induction and extinction rather than rotation of domain walls, a greater bandwidth may result.

Examples (a) through (f) have been described in terms of intermittent application of an electric field of the total magnitutde required to switch the dichroism. Under some circumstances, it may be desirable to maintain a D-C bias across one or both pairs of electrodes, the field so produced being slightly less than that required to switch, and by triggering with a field of smaller magnitude which when added to the D-C field is sufficient to bring about the desired effect.

The invention has been described in terms of a limited number of embodiments. For expediency, description has been in terms of a tetragonally distorted cubic crystal. Other orientations may permit or require a different electrode arrangement. In some tetragonal materials the easy direction may be defined by the parallel polarization rather than the perpendicular polarization. Where the description is in specific terms, reference is made to the a-domain barium titanate of copending application Ser. No. 543,603 to which reference is made above. Other materials showing the desired characteristics may be utilized with equal facility.

Similarly, the various embodiments have been described in terms of applied fields corresponding with crystallographic directions within the functional element and where the input beam is plane polarized in terms of the polarization plane, also so defined as to include such a direction. It may be desirable to utilize fields not corresponding with crystallographic directions and/or to introduce polarized beams having polarization planes not including such axes. Such variations are considered within the scope of the invention.

The invention is considered to derive from the effect on electromagnetic radiation of an electric field-dependent dichroism. It has been indicated that this effect may take the form of polarization of an unpolarized input beam in a sense dependent upon the direction of the applied field, or it may take the form of selective extinction of portions of a polarized input beam.

What is claimed is:

1. Device comprising the combination of a crystalline body manifesting dichroism which is electric field dependent and means for applying an electric field sufficient to effect dichroism in at least one direction substantially corresponding with that of a major crystallographic direction in the said body.

2. Device of claim 1 together with means for introducing a beam of electromagnetic radiation into said body.

3. Device of claim 2 in which the beam direction is substantially normal to the said crystallographic direction.

4. Device of claim 2 in which the said beam is plane polarized in a plane substantially defined by the beam direction and by a crystallographic direction of the said body.

5. Device of claim 1 in which the body manifests a direction of spontaneous electrical polarization.

6. Device of claim 1 together with means for maintaining the said body at a temperature above that at which the body is dichroic in the absence of an applied field.

7. Device of claim 1 with means for applying an electric field in a direction defining a second crystallographic axis within the said body.

8. Device of claim 7 with means for applying a rotating field to the said body.

9. Device of claim 1 in which the said body consists essentially of bismuth-doped a-domain barium titanate.

References Cited

UNITED STATES PATENTS

| | | | |
|---|---|---|---|
| 3,069,973 | 12/1962 | Ames | 350—150 |
| 3,093,477 | 6/1963 | Triebwasser. | |
| 3,348,217 | 10/1967 | Snaper | 350—150 |

OTHER REFERENCES

Casella & Keller, "Polarized Light Transmission of $BaTiO_3$ Single Crystals" Phys. Rev., vol. 116, No. 6 (Dec. 15, 1959) pp. 1469–1473.

Aurivillius & Fang, "Ferroelectricity in the Compound $Ba_2Bi_4Ti_5O_{18}$" Phys. Rev., vol. 126, No. 3 (May 1, 1962) pp. 893–896.

DAVID SCHONBERG, Primary Examiner

P. R. MILLER, Assistant Examiner

U.S. Cl. X.R.

350—147, 154, 155, 160